United States Patent
Kim et al.

(10) Patent No.: US 8,721,140 B2
(45) Date of Patent: May 13, 2014

(54) TRANSMISSION INDICATOR FOR VEHICLE

(75) Inventors: Sung Hwan Kim, Incheon (KR); Yeong Jae Jang, Seoul (KR); Jung Hoon Woo, Hwaseong-si (KR); Hee Jun Jeong, Hwaseong-si (KR); Hong Sik Chang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 87 days.

(21) Appl. No.: 13/449,103

(22) Filed: Apr. 17, 2012

(65) Prior Publication Data
US 2013/0145981 A1   Jun. 13, 2013

(30) Foreign Application Priority Data
Dec. 12, 2011 (KR) .................. 10-2011-0132513

(51) Int. Cl.
*B60Q 1/26* (2006.01)

(52) U.S. Cl.
USPC .......................................... 362/491; 362/488

(58) Field of Classification Search
USPC ............................ 362/26, 555, 491, 488, 511
See application file for complete search history.

(56) References Cited

U.S. PATENT DOCUMENTS

| 6,834,987 B2 * | 12/2004 | Zynda | 362/487 |
| 2006/0152937 A1 * | 7/2006 | Gandorfer | 362/491 |
| 2006/0187668 A1 * | 8/2006 | Howe | 362/491 |
| 2008/0316758 A1 * | 12/2008 | Kurokawa | 362/488 |

FOREIGN PATENT DOCUMENTS

| JP | 6-117524 A | 4/1994 |
| JP | 06-117525 A | 4/1994 |
| JP | 2003-11690 A | 1/2003 |
| JP | 2006-220626 A | 8/2008 |
| JP | 2010-049989 A | 3/2010 |
| KR | 101036817 B1 | 5/2011 |

\* cited by examiner

*Primary Examiner* — Laura Tso
(74) *Attorney, Agent, or Firm* — Morgan, Lewis & Bockius LLP

(57) ABSTRACT

A transmission indicator apparatus for a vehicle, may include a light source disposed on an upper surface of a PCB (Printed Circuit Board) and electrically configured in a circuit; a housing for housing the light source and the PCB therein; and a light guide sheet disposed at the front of the light source to deliver light of the light source to a character part therethrough, wherein the light source is integrated into the PCB.

9 Claims, 5 Drawing Sheets

TRANSMISSION INDICATOR FOR VEHICLE

CROSS-REFERENCE TO RELATED APPLICATION

The present application claims priority to Korean Patent Application No. 10-2011-0132513 filed Dec. 12, 2011, the entire contents of which is incorporated herein for all purposes by this reference.

BACKGROUND OF THE INVENTION

1. Field of the Invention

The present invention relates to a transmission indicator for a vehicle. More particularly, it relates to a transmission indicator, a character part of which can be illuminated.

2. Description of Related Art

Generally, Transmission indicator of a vehicle is a means for displaying the location of an automatic transmission lever, and is provided at one side of an area where the automatic transmission lever slides.

The automatic transmission lever slides into park (P), reverse (R), neutral (N), and drive (D) positions as its gear is being shifted. The location of the transmission lever is displayed with illumination on the character part of the Transmission indicator to allow a driver to visually know the location of the transmission lever.

A typical Transmission indicator needs a plurality of light sources, for example, about four to about six light sources, each of which is arranged under each character upon illumination of the character part of the Transmission indicator.

In order to overcome the above limitation, the illumination of the character part is being implemented by a single light source using a lighting guide plate and a method of printing a pattern on the rear surface of the lighting guide plate For example, as shown in FIG. 1, a typical Transmission indicator includes a lens 100 that is printed with P, R, N, D characters, emits night illumination, and displays the location of a TGS lever, a lighting guide plate 110 for illumination of the Transmission character part, a light source 120 for illumination of the lighting guide plate, a PCB (Printed Circuit Board) 130, a housing installed with the PCB 150 and the lens 100 and having an illumination shielding structure, a PCB 150, and a lower cover 160 for protecting the PCB 150.

In this case, since a separate PCB 130 for illumination of the lighting guide plate is needed to use the lighting guide plate in the above structure, the manufacturing cost may increase.

There are the following limitations in a technology of implementing the illumination of the Transmission character part using a typical lighting guide plate.

Due to limitations of the thickness of the lighting guide plate and the size of a light source chip, since illumination for the lighting guide plate cannot be configured in the transmission gear-controlling PCB 150, a light source for illumination of the lighting guide plate and a PCB 130 assembly are additionally needed to apply a light shielding structure to the character part.

Also, the lighting guide plate and the light source for illumination of the lighting guide plate are configured at the opposite side to the PCB 150 to interrupt the illumination of the light source, and a fixing structure for fixing the light source for the illumination of the lighting guide plate and the PCB 130 is additionally needed to adjust the position of the lighting guide plate and the light source for the illumination of the lighting guide plate. Accordingly, the whole structure becomes complicated.

As a result, there is a limitation in that the manufacturing cost increases due to the addition of a light source for a lighting guide plate, a PCB assembly, and a wiring.

FIG. 2 shows a limitation when a light source is applied to a transmission gear-controlling PCB.

In order to uniformly deliver light to a lighting guide plate 110, a light emitting part 170 of a light source 120 needs to be aligned with the center portion of the lighting guide plate 110. However, in a typical technology, the light emitting part 170 of the light source 120 cannot be aligned with the center portion of the lighting guide plate 110 due to the thickness of the lighting guide plate 110 and the light shielding structure.

Here, a reference numeral 180 unexplained shows a light-shielding plate that is disposed inside a housing 140 to interrupt light.

Accordingly, since the light source 120 for illumination of the lighting guide plate and the PCB 130 are additionally needed, the manufacturing cost increases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission indicator for a vehicle, which can be simplified in its whole structure and be reduced in the manufacturing cost, by implementing an improved integrated PCB-type surface illumination for a vehicle, which can illuminate the whole of a Transmission character part while still using a PCB using a method of integrating a light source for illumination into the PCB for illumination of the Transmission character part that uses one light source and a lighting guide plate.

The present invention also provides a transmission indicator for a vehicle, which can achieve high brightness and uniformity of light and can be applied to various fields to increase the quality of products and extend the application scope due to the curved shape of a lighting guide plate, by using a V-cut Flexible Lighting Sheet (VFLS) as the lighting guide plate that serves as an optical waveguide during illumination of a Transmission character part.

In one aspect, the transmission indicator apparatus for a vehicle, may include a light source disposed on an upper surface of a PCB (Printed Circuit Board) and electrically configured in a circuit, a housing for housing the light source and the PCB therein, and a light guide sheet disposed at the front of the light source to deliver light of the light source to a character part therethrough, wherein the light source may be integrated into the PCB.

The light source on the PCB includes a light emitting part, a center of which may be aligned with a center of the light guide sheet in a horizontal direction.

The housing further houses a light-shielding plate and the light guide sheet may be disposed on the light-shielding plate.

The light guide sheet may be flexible to implement a curved shape.

The light guide sheet may be formed of a waveguide sheet with a V-cut pattern.

The light guide sheet may be configured to show uniform brightness by adjusting a depth and a width of the V-cut pattern.

The light guide sheet has a thickness of about 0.15 mm to about 0.4 mm, a light-shielding plate on which the light guide sheet may be disposed has a thickness of about 2 mm to about 2.5 mm, a light emitting part of the light source on the PCB has a height of about 0.5 mm to about 2.5 mm, and a center axis of the light guide sheet may be aligned with the height of the light emitting part of the light source.

The light source emits light to an opposite side of the housing through an aperture of a central portion of the housing when the light source may be disposed on the upper surface of the PCB.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
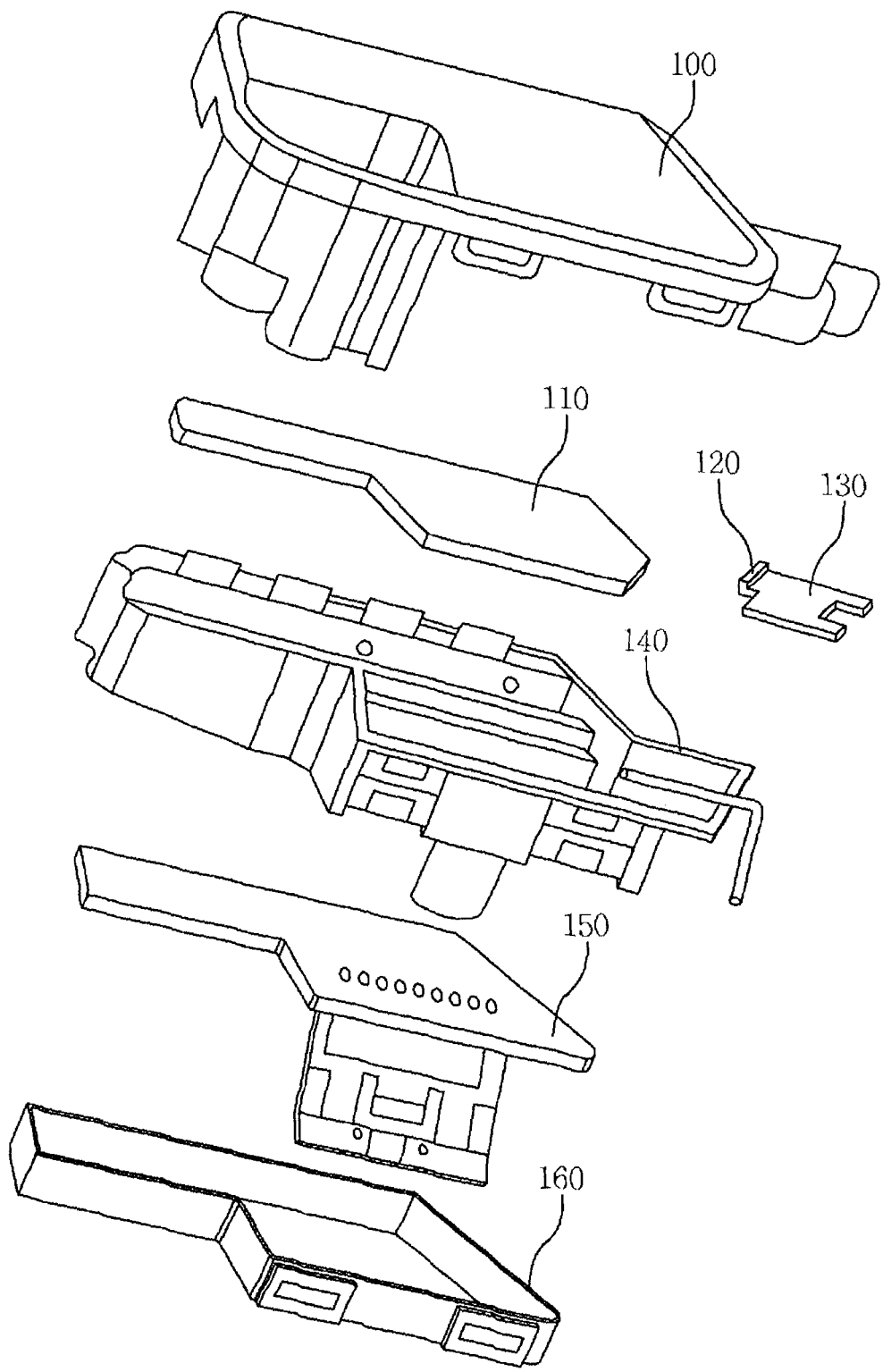
FIG. 1 is a perspective view illustrating a typical transmission indicator for a vehicle.
Figure 2:
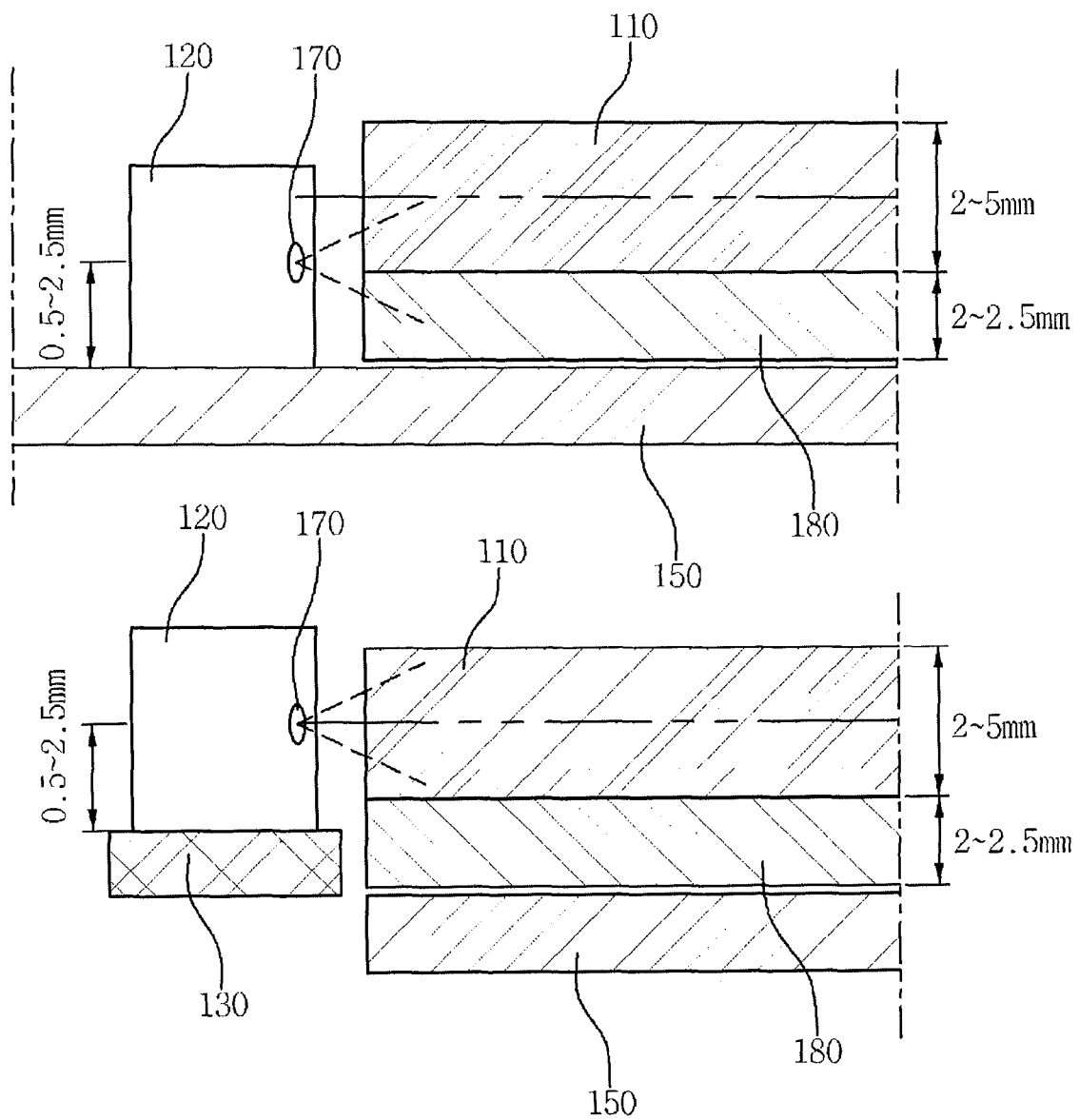
FIG. 2 is a view illustrating a limitation of a typical transmission indicator for a vehicle.

Reference numerals set forth in the Drawings includes reference to the following elements as further discussed below, It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings.

Figure 3:
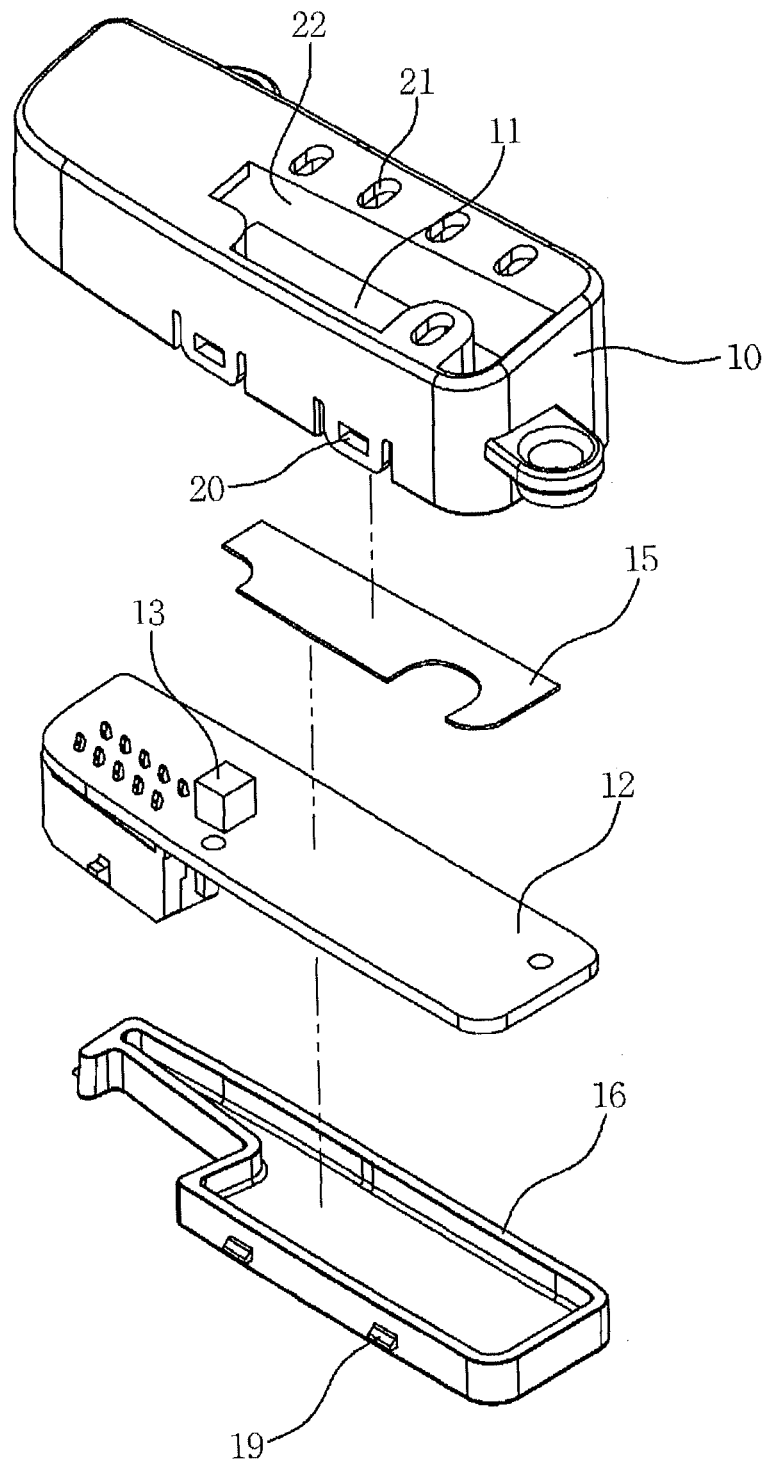
FIG. 3 is a perspective view illustrating a transmission indicator for a vehicle according to an exemplary embodiment of the present invention.
Figure 4:
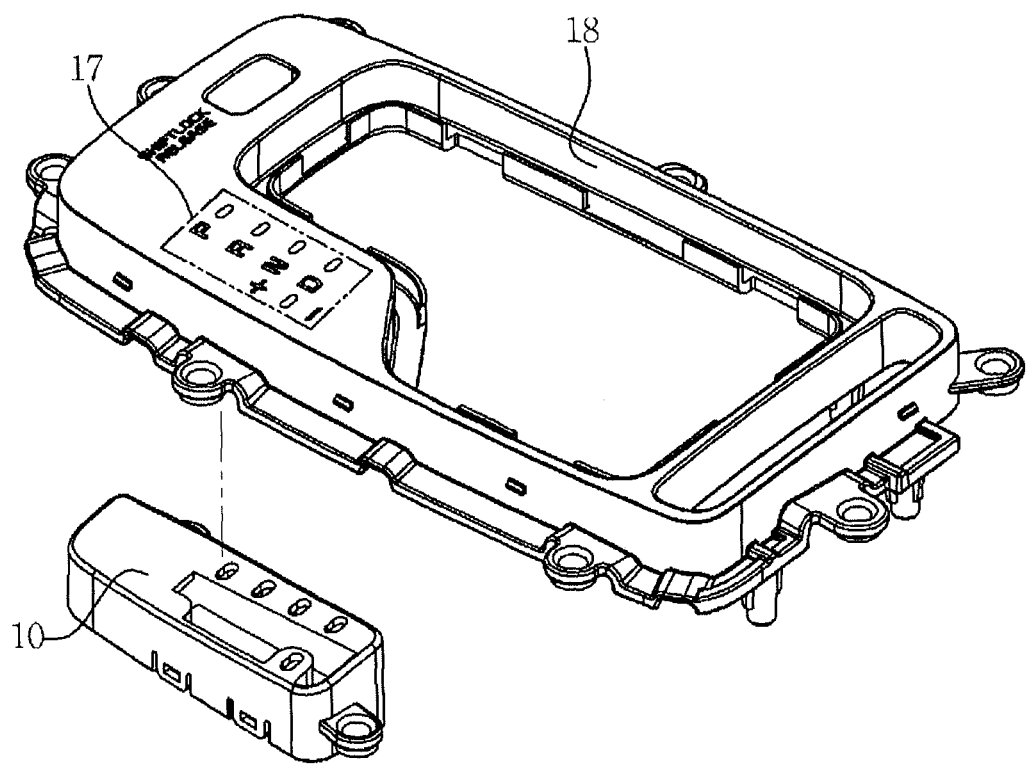
FIG. 4 is a cross-sectional view illustrating a transmission indicator for a vehicle according to an exemplary embodiment of the present invention.

FIG. 3 is a perspective view illustrating a transmission indicator for a vehicle according to an exemplary embodiment of the present invention. FIG. 4 is a cross-sectional view illustrating a transmission indicator for a vehicle according to an exemplary embodiment of the present invention.

As shown in FIGS. 3 and 4, the transmission indicator may illuminate the whole of a Transmission character part using a PCB that is being used for illumination of characters of transmission lever in a current vehicle. The transmission indicator may have a structure in which a light guide plate light emitting light source is integrated into the PCB.

For this, a housing 10 having a light-shielding plate 11 disposed therein may be provided. A PCB 12 may be disposed in the housing, and may be disposed under the light-shielding plate 11.

Here, the housing 10 is a sort of case that receives the PCB 12 and the like. The light-shielding plate 11 may be disposed on an inner wall of the housing 10. Also, an illumination opening 22 and a plurality of illumination apertures 21 may be formed at the upper portion of the housing to allow light of a light source 13 such as an LED to travel to a character part (17 of FIG. 5) on an indicator case (18 of FIG. 5).

Here, the character part 17 may be formed with a lens type. When the character part 17 receives light from the light source 13, each character may emit light according to its own shape, and may provide legibility to a driver.

A lens 24 printed with characters may be disposed on the front surface (upper surface) of the housing 10. In this case, the housing 10 may be fitted into a housing seating part prepared by cutting one side of the indicator case 18.

Particularly, the light source 13 may be directly mounted on the upper surface of the PCB 12. The light source 13 may be electrically configured in a circuit on the PCB 12.

The PCB and the light source for illumination of the lighting guide plate may be integrated into the PCB 12.

The light source 13 may be disposed at a side of the light-shielding plate 11 of the housing 10, and may emit light to a light guide sheet 15, i.e., lighting guide plate installed at the light-shielding plate 11.

When the light source 13 is disposed on the upper surface of the PCB 12, the light source 13 may emit light to the opposite side of the housing 10 through an aperture 23 of the central portion of the housing 10, for example, a kind of cutting part that is formed at the end portion of the light-shielding plate 11. Accordingly, light from the light source 13 located at the upper side may be transmitted to the light guide sheet 15 through the aperture.

Also, the light guide sheet 15 may serve to transmit light of the light source 13 to the character part 17 of the indicator case 18, i.e., character displaying part.

The light guide sheet 15 may be supported by the light-shielding plate 11. The center of the thickness of the light guide sheet 15 may be aligned with a light emitting part 14 of the light source 13 on the PCB 12.

Particularly, the light guide sheet 15, which is an optical waveguide sheet, may be formed of a V-cut Flexible Lighting Sheet (VFLS) with a V-cut pattern. Since the thickness of the VFLS is smaller than the thickness (e.g., about 2 mm to about 5 mm) of an injection-type lighting guide plate, the light source 13 may be integrated into the PCB 12.

Since the light guide sheet 15 formed of such an optical waveguide sheet is flexible, curved shapes that cannot be implemented in a typical LGP can be implemented.

Also, since the light guide sheet 15 is appropriately designed in depth and width of the V-cut pattern, bright light with uniform brightness can be emitted. Furthermore, since light piping is formed with a V-cut pattern, light can be induced even into a shaded spot.

Thus, since the light guide sheet 15 has a V-cut pattern instead of a typical pattern of a laser or pressing type, the brightness and uniformity of light can be improved in quality. Also, due to the VFLS, curved shapes that cannot be implemented in the LGP can be implemented.

A cover 16 may be provided to finish the lower portion of the housing, and may be coupled to a coupling aperture 20 of the housing 10 using a coupling hook 19.

Figure 5:
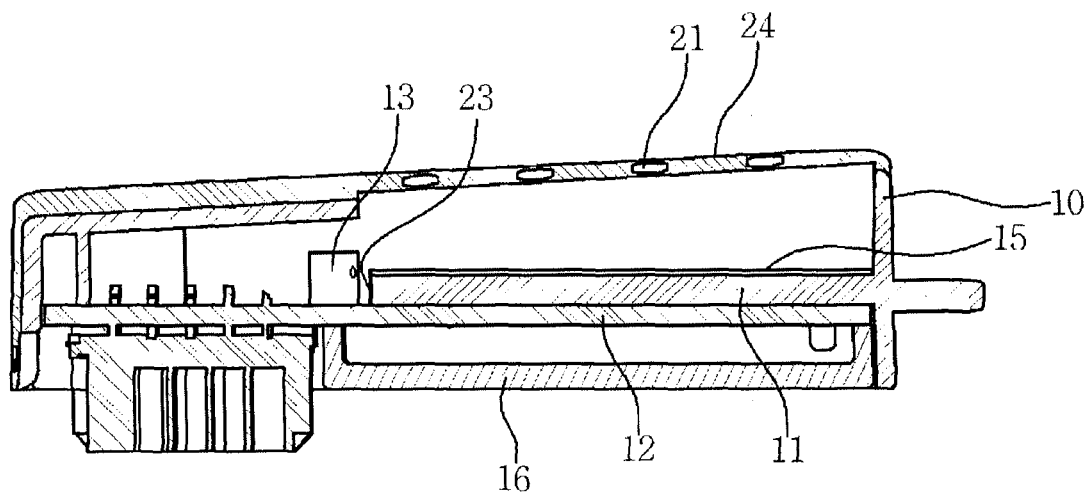
FIG. 5 is a perspective view illustrating an installation state of a transmission indicator for a vehicle according to an exemplary embodiment of the present invention.

FIG. 5 is a perspective view illustrating an installation state of a transmission indicator for a vehicle according to an exemplary embodiment of the present invention.

As shown in FIG. 5, the housing 10 including the PCB 12 mounted with the light source 13 may be coupled by, e.g., a bolting method to a lower portion of the character part 17 that is formed at one side of the indicator cover 18.

Here, since displays such as various characters, symbols, and marks of the character part 17 are formed of a light transmittable lens type, the displays of the character part 17 may emit light when light is irradiated on the lower portion of the character part 17. Accordingly, a driver can visually verify the state of the transmission step through the illumination of the character part 17.

Figure 6:
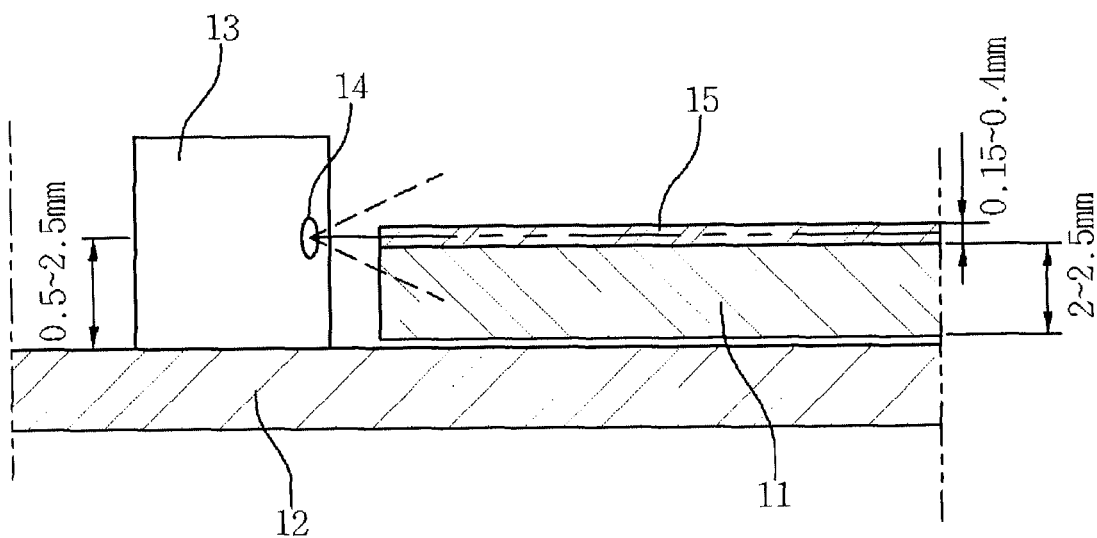
FIG. 6 is a view illustrating an illumination principle of a transmission indicator for a vehicle according to an exemplary embodiment of the present invention.

FIG. 6 is a view illustrating an illumination principle of a transmission indicator for a vehicle according to an exemplary embodiment of the present invention.

As shown in FIG. 6, the light source 13 for illumination of the VFLS may be disposed on the PCB.

In order to uniformly irradiate light source illumination on the light guide sheet 15, a distance from the housing (light-shielding plate) to the center of the light guide sheet 15 has to be within about a distance of about 2.5 mm from the PCB 12 to the light emitting point, i.e., light emitting part 14 of the light source 13. For this, a VFLS (thickness of about 0.15 mm to about 0.4 mm) may be used instead of an injection type lighting guide plate.

The light guide sheet 15 may have a thickness of about 0.15 mm to about 0.4 mm. In this case, the thickness of the light-shielding plate 11 may range from about 2 mm to about 2.5 mm, and the height from the upper surface of the transmission gear-controlling PCB 12 to the light emitting part 14 of the light source 13 may range from about 0.5 mm to about 2.5 mm.

When the thickness of the light guide sheet 15 and the light-shielding plate 11 is appropriately adjusted within the above range, and the height of the light source 13 is adjusted within a maximum of about 2.5 mm, the light emitting point may be exactly aligned with the center of the light guide sheet 15, thereby uniformly delivering the light to the light guide sheet 15.

Thus, compared to a related art where a light source cannot be located in a transmission gear-controlling PCB due to the basic thickness (about 2 mm to about 5 mm) of a lighting guide plate and the thickness (about 2 mm to about 2.5 mm) of a light-shielding plate, a transmission indicator for a vehicle according to an exemplary embodiment of the present invention has an integrated PCB structure in which a light source is integrated into a PCB, by using a light guide sheet with a VFLS type and appropriately designing a height relation among related components. Accordingly, it is possible to provide an illumination apparatus that is advantageous in terms of structure and cost.

A transmission indicator for a vehicle according to an exemplary embodiment of the present invention has the following advantages.

First, since a light source for illumination and a PCB assembly are integrated into a PCB, the structure of the transmission indicator can be simplified. Also, since a PCB for illumination is omitted, the manufacturing cost can be reduced.

Second, bright light with uniform brightness can be produced by controlling/designing the depth and width of a V-cut pattern, and an additional expense is not needed to modify the pattern.

Third, since light piping is formed in a V-cut pattern, light can be induced even into a shaded region.

Fourth, since curved shapes that cannot be implemented in a Lighting Guide Plate (LGP) can be implemented using a V-cut Flexible Lighting Sheet (VFLS), the application scope can be extended.

Fifth, compared to a typical LGP, the brightness increases, and the uniformity of light can be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission indicator apparatus for a vehicle, comprising:
    a light source disposed on an upper surface of a PCB (Printed Circuit Board) and electrically configured in a circuit;
    a housing for housing the light source and the PCB therein; and
    a light guide sheet disposed at the front of the light source to deliver light of the light source to a character part therethrough,
    wherein the light source is integrated into the PCB such that the light source is directly mounted on the upper surface of the PCB and electrically configured in a circuit on the PCB, and wherein the PCB is configured to control a transmission gear and the light source.

2. The transmission indicator apparatus of claim 1, wherein the light source on the PCB includes a light emitting part, a center of which is aligned with a center of the light guide sheet in a horizontal direction.

3. The transmission indicator apparatus of claim 1, wherein the housing further houses a light-shielding plate and the light guide sheet is disposed on the light-shielding plate.

4. The transmission indicator apparatus of claim 1, wherein the light guide sheet is flexible.

5. The transmission indicator of claim 1, wherein:
   the light guide sheet has a thickness of about 0.15 mm to about 0.4 mm;
   a light-shielding plate on which the light guide sheet is disposed has a thickness of about 2 mm to about 2.5 mm;
   a light emitting part of the light source on the PCB has a height of about 0.5 mm to about 2.5 mm; and
   a center axis of the light guide sheet is aligned with the height of the light emitting part of the light source.

6. The transmission indicator of claim 1, wherein the light source emits light to an opposite side of the housing through an aperture of a central portion of the housing when the light source is disposed on the upper surface of the PCB.

7. The transmission indicator of claim 1, wherein the light guide sheet is flexible.

8. The transmission indicator of claim 1, wherein:
   the light guide sheet has a thickness of about 0.15 mm to about 0.4 mm;
   a light-shielding plate on which the light guide sheet is disposed has a thickness of about 2 mm to about 2.5 mm;
   a light emitting part of the light source on the PCB has a height of about 0.5 mm to about 2.5 mm; and
   a center axis of the light guide sheet is aligned with the height of the light emitting part of the light source.

9. The transmission indicator of claim 1, wherein an illumination opening directly receiving a light from the light source is positioned above the light guide sheet in the housing.

* * * * *